Oct. 23, 1934.  A. A. GLIDDEN  1,978,044
METHOD OF FORMING RUBBER PARTS AND APPLYING THEM TO BACKING MATERIAL
Filed Jan. 13, 1933
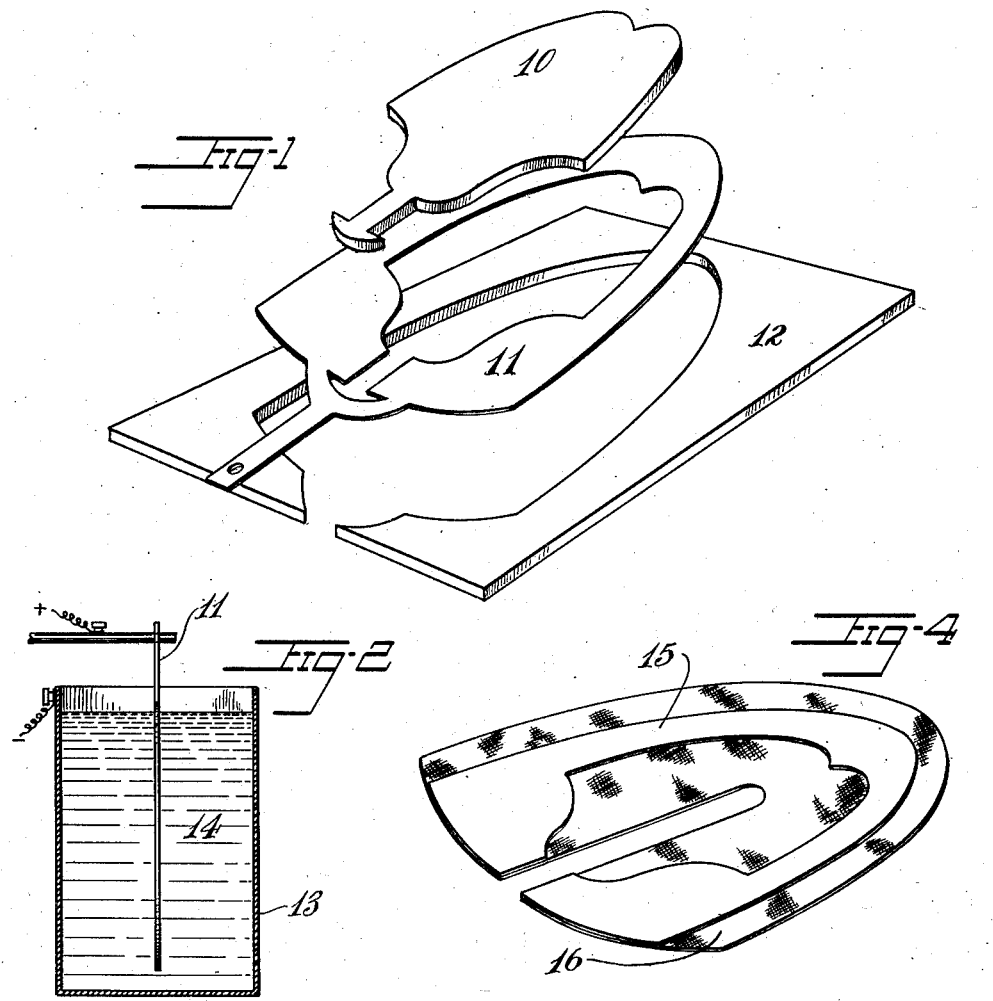
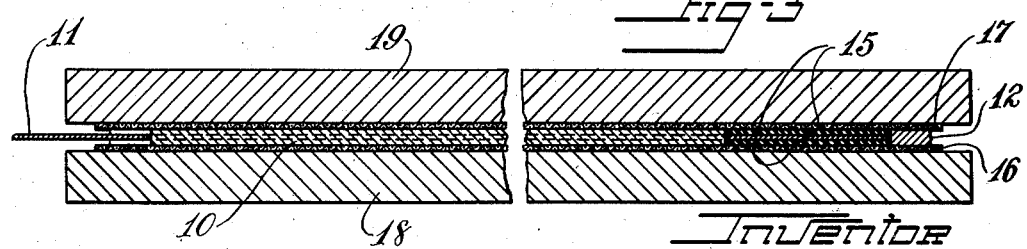
Inventor
Alfred A. Glidden
By Eakin & Avery
Attys Patented Oct. 23, 1934

1,978,044

UNITED STATES PATENT OFFICE 1,978,044

METHOD OF FORMING RUBBER PARTS AND APPLYING THEM TO BACKING MATERIAL

Alfred A. Glidden, Watertown, Mass., assignor to Hood Rubber Company, Inc., Watertown, Mass., a corporation of Delaware Application January 13, 1933, Serial No. 651,648

5 Claims. (Cl. 18—59)

This invention relates to methods of forming a rubber part or unit and applying it to a web or sheet of material such as fabric, paper, leather or the like, and the method is especially useful in the manufacture of footwear.

The principal objects of the invention are to provide accuracy, economy, and efficiency in the forming of rubber parts and placing them on webs of textile or other material.

Other objects will appear from the following description and the accompanying drawing.

In the drawing:

Fig. 1 is a perspective view of a set of forms or templates used in practicing the invention.

Fig. 2 is a sectional view of an electrolytic cell for depositing rubber onto a form.

Fig. 3 is a vertical section of a set of forms, rubber coatings, and webs of material between press platens.

Fig. 4 is a perspective view of the finished article.

Referring to the drawing, the invention is most readily understood by reference to the apparatus used in practicing it. Fig. 1 illustrates a plurality of forms or templates 10, 11 and 12 made from sheet material, preferably thin metal, the forms being adapted to nest together, and the form 11 being substantially thinner than the other two. The plate or form 11 is made to the configuration of a rubber part which it is desired to form and apply to a web or sheet of material.

A coating of sheet rubber is formed upon plate 11 in any convenient manner, as by dipping the form in a solution or dispersion of a rubber composition and depositing a coating 15 thereon of such thickness that the plate 11 with the rubber coating on its two opposite faces is approximately as thick, and preferably a little thicker, than the plate 10 or 12. In Fig. 2 the plate 11 is shown as the positively charged anode of an electrolytic cell in which the container 13 is the cathode and a natural or artificial dispersion of rubber 14 is the electrolyte. The source of electric current may be dispensed with and the rubber deposited from an aqueous dispersion by the use of a coagulant previously deposited on the form. Where a solution of the rubber in an organic solvent is used the plate 11 is successively dipped and the coating thereon dried until a coating of rubber of the desired thickness is obtained.

The form 11 with its coating is now ready to be applied to the sheet of fabric, paper, leather or the like. That sheet may have been previously coated with a rubber adhesive if desired, but that is not necessary to the operation of the invention. Any one of the plates 10, 11, or 12, but preferably one of the uncoated plates, is now placed upon the fabric or other web material 16 in the proper location and the other plates are then nested therewith, the nesting operation being employed for shearing off the excess rubber from the edge face of the plate 11. Plate 12, for instance, which is uncoated, may be laid on the web and plate 11 bearing the rubber coating laid over and pressed into the opening therein. Plate 10 may then be laid over plate 11 in registry therewith and pressed into the opening therein. A second web 17 is then placed upon the assembly of plates and the complete assembly is pressed between moderately heated platens 18, 19, which causes the respective portions of the rubber coating to adhere respectively to the adjacent webs 16, 17.

One of the articles formed by this method is illustrated in Fig. 4 as the vamp of a shoe comprising a canvas web 16 and a layer of rubber 15 having the shape of plate 11 and providing the trim of the vamp.

For the most efficient use of the method, it is preferable to effect the attachment of the rubber layers 15 on opposite sides of the plate 11 to two webs simultaneously, as described, but the invention is not limited to that feature.

By the use of this method the rubber parts may be of any shape or size and are accurately located on the fabric without distortion of the rubber and without waste of material, there being very little unvulcanized scrap to be reworked or disposed of.

I claim:

1. The method of forming a sheet rubber part and applying it to a web of material which comprises mounting a surrounding covering of rubber compound upon a form having the outline of the desired rubber part, trimming the rubber from the periphery of the form, and pressing webs of material against the rubber compound on the opposite faces of the form.

2. The method of forming sheet rubber parts and applying them to web material which comprises mounting a surrounding covering of rubber compound and applying them upon a form of sheet material having the outline of the desired rubber parts, placing said form between layers of web material, and separating the rubber parts at the periphery of the form.

3. The method of forming a sheet rubber part and applying it to web material which comprises mounting a layer of rubber compound upon a form of sheet material having the outline of the desired rubber part, trimming excess rubber from a margin of the form by coaction of a complementary form, and transferring the rubber on one side of the form to a web by pressing it thereagainst while confining the rubber by means of the said complementary form.

4. The method of forming sheet rubber parts and applying them to web material which comprises mounting a surrounding layer of rubber compound upon a form of sheet material having the outline of the desired rubber parts, and uniting layers of web material to the rubber on each side of the form by pressure while confining the rubber by means of a complemental form.

5. The method of forming sheet rubber parts and applying them to web material which comprises forming a rubber article including two opposed side portions having the shape of the desired parts and united at their peripheries, arranging said articles between two webs of material, uniting the sides of the articles to their contacting webs, and separating the sides thereof at their peripheries.

ALFRED A. GLIDDEN.